Sept. 16, 1930.  C. V. KIRSCH  1,775,679
AUTOMATIC OILER FOR HANDSAWS
Filed July 31, 1929
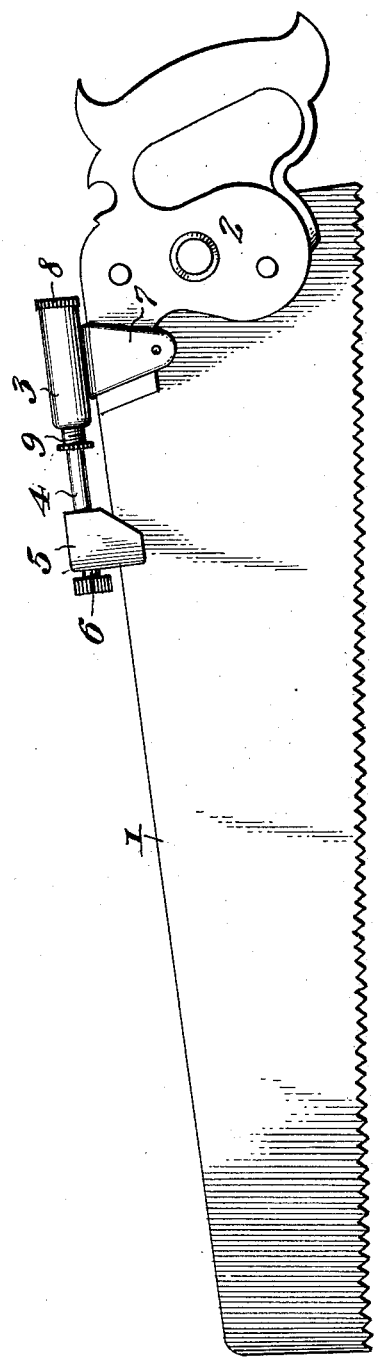
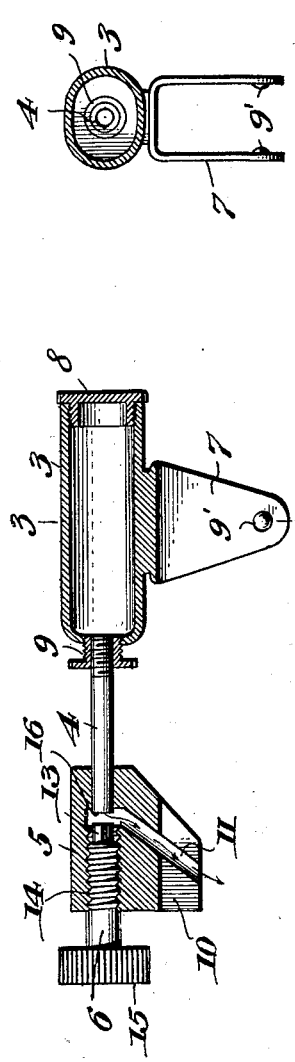
Inventor,
Charles Valentine Kirsch
By
Atty.

Patented Sept. 16, 1930

1,775,679

UNITED STATES PATENT OFFICE

CHARLES VALENTINE KIRSCH, OF EVANSVILLE, INDIANA

AUTOMATIC OILER FOR HANDSAWS

Application filed July 31, 1929. Serial No. 382,363.

The object of this invention is the provision of an improved oiling attachment which can be readily applied to any hand saw as, for instance, a carpenter's hand saw, by which any desired amount of oil may be automatically fed to the saw blade to afford the requisite lubrication when the saw is in use.

The invention also contemplates the provision of a regulating and cut-off valve arranged and combined with other parts in a novel manner, enabling the feed of the oil to be regulated, or to be entirely cut off.

The present oiler is so constructed that it may be readily attached to the saw handle without requiring the use of screws or fastenings or marring the handle and in a manner enabling the device to be carried by the saw when in use, without interfering with sawing operations.

In the accompanying drawings:

Figure 1 is a side elevation of a carpenter's hand saw equipped with the present oiler;

Fig. 2 is a longitudinal detail section of the oiler; and

Fig. 3 is a section on the line 3—3, Fig. 2.

The blade of an ordinary carpenter's saw is shown at 1 and its wooden handle appears at 2.

My improved oiler comprises an oil can or reservoir 3, a feed pipe 4, a feeding head 5, a feed regulating and cut-off screw 6, and an attaching clamp 7.

The oil can or reservoir 3 may have a removable cap 8 by which it can be re-filled, or, the outer end of the reservoir may be solid and oil introduced into the reservoir 3 by removing the screw threaded nipple 9. The reservoir is designed to lie above the back of the handle 2 and is provided with a spring clamp or fastener 7 composed of springy jaws which straddle the top of the handle 2 and have nibs or projections 9' which engage the inner margin of the back of said handle 2, thereby retaining the device in position and yet enabling it to be quickly removed whenever desired. The springiness of the attaching device 7 does away with the necessity of using screws or fastenings to connect the appliance to the handle 2.

The feeding part of the oiler comprises the tube or pipe 4, feeding head 5 and screw valve 6.

The tube 4 is screwed into the nipple 9, the latter having internal screw threads for that purpose. This enables the feeder to be detached from the nipple 9 when desired.

The feeding head 5 is split as shown at 10 to enable it to receive the back of the saw 1 and it is provided with a feed channel 11 comprising grooves in the adjacent walls of the split part of the head so that the lubricant will pass down on opposite sides of the blade 1.

The tube 4 is secured in any suitable manner to the head 5 in position to lead the oil from the can 3 to the feed channels 11.

The screw valve 6 has a squared inner end or tip 13, is screwed into the head 5 at 14, and is provided with a knurled head 15 by which it may be screwed inwardly or outwardly. The stem of the valve 6 is arranged coaxially with the tube 4 so that the square inner end 13 of said valve will be adapted to regulate the width of the passage between itself and the seat 16, constituting the inner end of the tube 4, or, said squared end 13 may be seated on said seat 16, thereby entirely cutting off the feed of the lubricant from the pipe or tube 4 to the channel 11.

Any desired feed may be obtained by turning the head 15 but when oiling is not needed or the device is removed, the valve can be screwed up tight against the seat 16.

What I claim is:

In an automatic oiler for hand saws, the combination with a split oil distributing head adapted to straddle the blade of the saw and provided with an upper main channel located above the edge of the saw, and supplemental channels in the split parts of the head for feeding oil to both sides of said blade, of a screw valve controlling the flow of oil through said upper main channel, a tube for delivering oil to said channel, an oil reservoir to which the tube is connected, and attaching means for attaching the reservoir to the handle of the saw whereby to hold the reservoir head on the saw.

In testimony whereof I affix my signature.

CHARLES VALENTINE KIRSCH.